Figure 1:
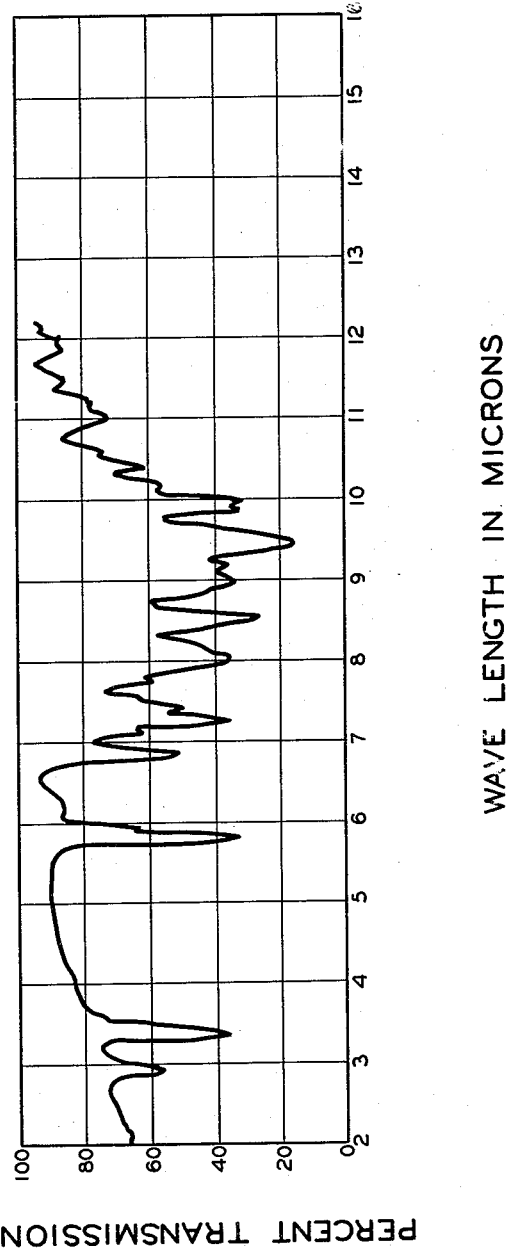

INVENTOR.
VERLIN C. STEPHENS

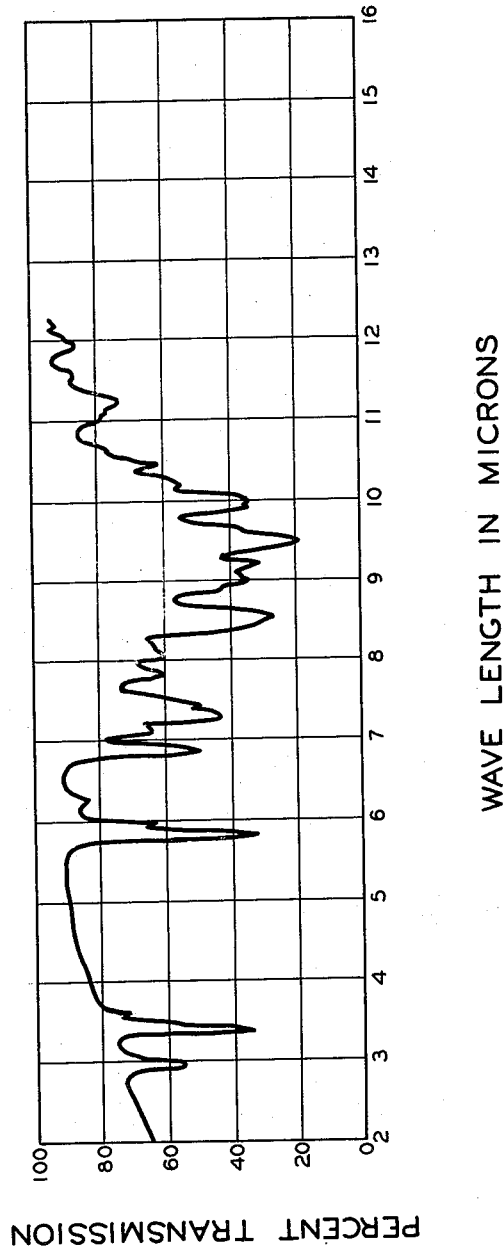

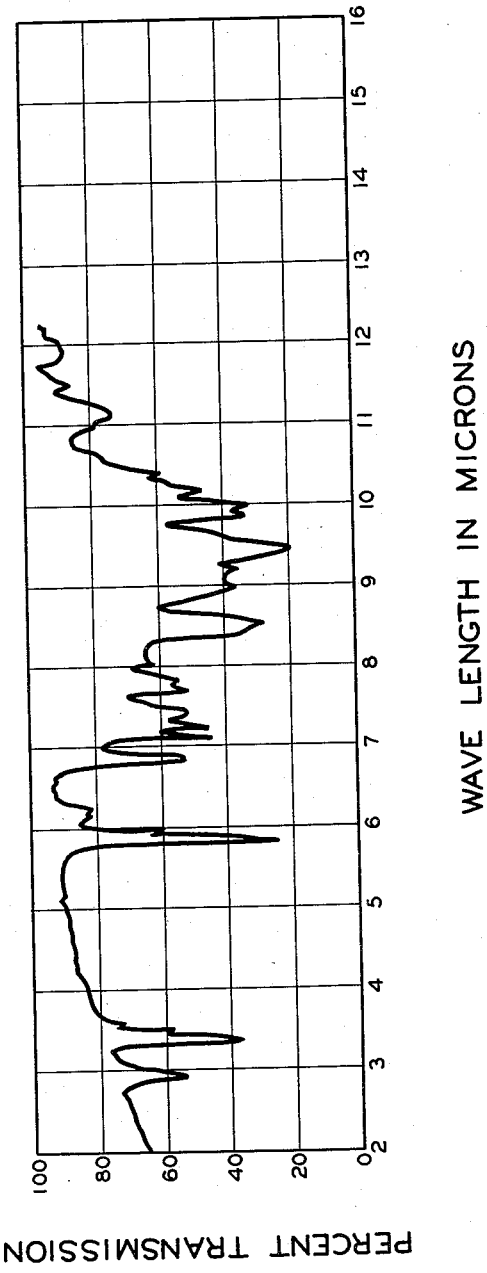

2,993,833
ERYTHROMYCIN ESTERS
Verlin C. Stephens, Indianapolis, Ind., assignor to Eli Lilly and Company, Indianapolis, Ind., a corporation of Indiana
Filed July 2, 1958, Ser. No. 746,142
5 Claims. (Cl. 167—55)

This invention relates to esters of erythromycin, specifically to the acetyl, propionyl, and acrylyl monoesters of erythromycin, and to therapeutic compositions of said esters.

The above esters when administered orally for therapeutic purposes provide blood levels having erythromycin activities which are greater and more prolonged than those obtainable by oral administration of corresponding amounts of erythromycin.

The esters of this invention are white, crystalline compounds of somewhat indefinite melting point. They are relatively insoluble in water and hydrocarbon solvents, but are readily soluble in polar solvents such as alcohols, ketones, and esters.

Like erythromycin, the monoesters of this invention are capable of forming stable salts with acids, both inorganic acids, for example hydrochloric, sulfuric, and phosphoric acids, and the stronger organic acids, for example oxalic, dichloroacetic, and naphthalenesulfonic acids, and the like. With weaker organic acids, the esters form salts which tend to hydrolyze in water. Both the ester bases and their acid addition salts possess antibiotic activity and are therapeutically equivalent. It is understood, of course, that should an acid addition salt be employed for therapeutic purposes, the acid associated with the ester base should be of relatively nontoxic character.

Generally, the erythromycin esters of this invention are solvated, the degree of solvation being dependent upon the solvent from which the compounds are crystallized. Both simple and mixed solvates can be obtained. Thus, for example, crystallization of monoacetylerythromycin from pyridine can yield monoacetylerythromycin which contains pyridine as the solvate. Recrystallization of monoacetylerythromycin from about 50 percent aqueous acetone can yield a solvated ester containing both acetone and water. The solvate molecules are held rather tenaciously, and this is especially true of water of hydration. The monohydrate is quite stable, and the water of hydration can be removed only by prolonged exposure to strong drying conditions. Under such conditions the molecule tends to lose its crystalline structure.

Since there are several hydroxyl groups present in the erythromycin molecule, a plurality of monoesters is theoretically possible. However, on the basis of electrometric titration values which in comparison with those of erythromycin show a shift of the pKa to a more acid condition, i.e., a lower pH, it appears that the esterified hydroxyl group is that group adjacent to the nitrogen atom in the erythromycin molecule. Thus, the novel compounds of this invention can be represented by the following formula:

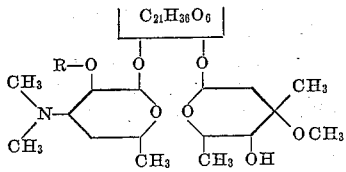

in which R represents an acetyl, a propionyl, or an acrylyl group. For the sake of convenience, the erythromycin molecule in the above formula has been somewhat simplified over the complete formula as set forth in J. Am. Chem. Soc. 79, 6062 (1957).

The erythromycin esters are readily prepared by acylating erythromycin with about one molecular equivalent of an acylating agent which can be the acid halide or the anhydride of acetic, propionic, or acrylic acid. A molecularly equivalent amount of an alkaline-reacting substance can be employed to remove from the reaction zone the acid which is produced in the course of the reaction. Separation and purification of the novel esters is effected by customarily employed isolation and purification techniques.

The esters of this invention are readily identified by their physical properties, the most characteristic of which consist of melting point, optical rotatory power, $R_f$ values, pKa, and infrared absorption. In the accompanying drawings there are set forth as FIG. 1, FIG. 2, and FIG. 3 the infrared absorption curves of chloroform solutions of monoacetylerythromycin, monopropionlyerythromycin, and monoacrylylerythromycin, respectively.

The characteristic properties of the novel compounds of this invention are set forth below.

MONOACETYLERYTHROMYCIN

Melting point: 124–130° C.
$[\alpha]_D^{25} = -81.7$ (C=1, in acetone)
$R_f = .59$ (4 parts methyl isobutyl ketone-1 part ethyl propyl ketone)
pKa=6.9 (in dimethylformamide)
Infrared absorption bands (chloroform solution): 2.87, 3.38, 5.75, 5.91, 6.85, 7.13, 7.27, 7.42, 7.78, 8.05, 8.57, 8.90, 9.01, 9.20, 9.47, 9.89, 9.99, 10.20, 10.43, 11.02, 11.51, 11.90.

MONOPROPIONYLERYTHROMYCIN

Melting point: 122–128° C.
$[\alpha]_D^{25} = -81.6$ (C=1, in acetone)
$R_f = .65$ (4 parts methyl isobutyl ketone-1 part ethyl propyl ketone)
pKa=6.9 (in dimethylformamide)
Infrared absorption bands (chloroform solution): 2.85, 3.38, 5.76, 5.91, 6.84, 7.13, 7.26, 7.43, 7.79, 7.86, 8.45, 8.58, 8.90, 9.02, 9.22, 9.50, 9.65, 9.90, 10.00, 10.20, 10.43, 11.20, 11.53, 11.90.

MONOACRYLYLERYTHROMYCIN

Melting point: 126–130° C.
$[\alpha]_D^{25} = -82.2$ (C=1, in acetone)
$R_f = .68$ (4 parts methyl isobutyl ketone-1 part ethyl propyl ketone)
pKa=6.9 (in dimethylformamide)
Infrared absorption bands (chloroform solution): 2.85, 3.37, 5.77, 5.91, 6.84, 7.10, 7.24, 7.42, 7.72, 7.86, 8.42, 8.57 8.99, 9.20, 9.47, 9.65, 9.88, 9.98, 10.15, 10.42, 11.16.

This invention is further illustrated by the following specific examples:

*Example 1.—Preparation of monoacetylerythromycin*

To a cold solution (0° C.) of 30 g. of erythromycin in 200 ml. of acetone are added 15 g. of sodium bicarbonate, and to the mixture are added dropwise with stirring 4.5 ml. of acetyl chloride dissolved in 50 ml. of acetone. The mixture is allowed to stand overnight at room temperature and is then treated with about two volumes of water. The white, crystalline precipitate of monoacetylerythromycin which separates is filtered off. The crystalline precipitate is dissolved in 350 ml. of acetone, the solution is filtered to remove a small amount of insoluble material, and is decolorized twice with decolorizing carbon. 425 ml. of water containing 2 g. of sodium bicarbonate are added slowly with stirring, and the mixture is allowed to stand for several hours at about 0° C. The crystalline precipitate of monoacetylerythromycin which separates is filtered off and washed well with water. The material is dried for a few hours in the air and is further dried at room temperature in vacuo. It melts indefinitely over a range of about 125–130° C.

*Example 2.—Preparation of monopropionylerythromycin*

To a solution of 10 g. of erythromycin in 600 ml. of dry benzene are added 2.4 g. of magnesium oxide, and to the mixture 1.32 g. of propionyl chloride dissolved in 36 ml. of dry benzene are added dropwise with stirring over a one-hour period. Stirring is continued for two hours, and the mixture is then filtered to remove the precipitate comprising a mixture of monopropionylerythromycin and magnesium compounds. The erythromycin ester is extracted from the mixture with four 50 ml. portions of hot chloroform, the chloroform extracts are combined and filtered, and the filtrate is washed twice with 100 ml. portions of 2 percent aqueous sodium bicarbonate solution, and twice with 100 ml. portions of water. The washed chloroform filtrate is evaporated to dryness in vacuo yielding a residue comprising monopropionylerythromycin. The residue is recrystallized twice from dilute aqueous acetone yielding white crystals of monopropionylerythromycin hydrate. Prolonged drying of the monohydrate at 80° C. in vacuo over phosphorus pentoxide yields anhydrous monopropionylerythromycin.

*Example 3.—Preparation of monoacrylylerythromycin*

20 g. of erythromycin are dissolved in 140 ml. of anhydrous methanol-free acetone, and 10 g. of anhydrous sodium bicarbonate are added to the solution. To the mixture are added dropwise with stirring 2.7 g. of acrylyl chloride, dissolved in 25 ml. of anhydrous methanol-free acetone, and stirring is continued for about three hours following the completion of the addition of the acrylyl chloride. 160 ml. of water are then added to the mixture slowly with stirring whereupon monoacrylylerythromycin separates in crystalline form. The mixture is cooled overnight in the refrigerator (5–8° C.), the precipitate is filtered off, and is washed with small amounts of cold acetone-water mixture. The monoacrylylerythromycin is recrystallized by dissolving it in 160 ml. of acetone and adding about 100 ml. of water slowly with stirring. The recrystallized product is dried in vacuo for three hours. It melts indefinitely at about 126–130° C.

*Example 4.—Preparation of monoacetylerythromycin*

10 kg. of erythromycin are dissolved in 17 l. of acetone at 25° C., and to the solution are added 2040 g. of potassium bicarbonate. 1345 g. (1.25 equivalents based on the erythromycin) of acetyl chloride are added to the vigorously stirred mixture over a period of one-half hour, and stirring is continued for fifteen minutes longer. To the mixture 21 l. of water are added with stirring at a rate of about 1 l. per minute. During the addition an amount of crystalline monoacetylerythromycin precipitates. An additional amount of 141 l. of water are then added slowly with stirring, and after the addition the mixture is allowed to stand for about one-half hour to permit a more complete precipitation of monoacetylerythromycin. The crystalline precipitate is filtered off and is washed with 15 l. of water. The crystals are dried in vacuo at 50° C. for about 48 hours. The product obtained is the monohydrate of monoacetylerythromycin.

*Example 5.—Preparation of monopropionylerythromycin*

15.7 kg. of erythromycin are dissolved in 60 l. of acetone at 25° C. The reaction mixture is chilled by externally applied cold water and 5470 g. of propionic anhydride are added to the solution with stirring. The mixture is allowed to stand for four hours with no agitation, at the end of which time the mixture is cooled to 10° C. 6 l. of 28 percent aqueous ammonium hydroxide are added slowly with stirring followed by 141 l. of water which are added at a rate of about 1 l. per minute. During the addition of the water, a precipitate of crystalline monopropionylerythromycin separates. The precipitate is filtered off and is washed with two 30 l. portions of water. The crystalline product is dried in vacuo at 50° C. for about three days. The product obtained is the monohydrate of monopropionylerythromycin.

*Example 6.—Preparation of monopropionylerythromycin hydrochloride*

To a cold solution of 5 g. of erythromycin in 30 ml. of anhydrous acetone are added with stirring 0.65 g. of propionyl chloride dissolved in 5 ml. of anhydrous acetone. During the course of the addition a white precipitate of monopropionylerythromycin hydrochloride separates. The precipitate is filtered off, is washed with several portions of anhydrous acetone and is dried in vacuo. The monopropionylerythromycin hydrochloride melts with decomposition at about 140–146° C.

From the hydrochloric salt the free base of monopropionylerythromycin is obtained by dissolving the salt in water and neutralizing the solution with sodium bicarbonate. The monopropionylerythromycin hydrate which separates is filtered off and is dried in vacuo.

*Example 7.—Preparation of monoacetylerythromycin hydrochloride*

A solution of 2 g. of monoacetylerythromycin in 20 ml. of chloroform is cooled to about 0° C. and dry hydrogen chloride gas is passed into the solution. The white precipitate of monoacetylerythromycin hydrochloride which separates is filtered off and dried. It melts with decomposition at about 150–157° C.

Other acid addition salts of the erythromycin esters are prepared by conventional processes of a character similar to that described above.

Therapeutic compositions suitable for oral administration embodying the erythromycin esters of this invention are prepared by combining an ester with a pharmaceutical extending medium which is bland to gastromucosa. Solid medicament compositions suitable for oral administration comprise dosage forms such as compressed tablets, and filled telescoping gelatin capsules.

A composition suitabe for formulation into compressed tablets is made up of the following listed ingredients in the amounts shown:

| | Kg. |
|---|---|
| Monopropionylerythromycin | 10.0 |
| Magnesium stearate | 0.08 |
| Starch powder | 0.24 |
| Sodium lauryl sulfate | 0.12 |

One-half of the starch powder is heated with a small amount of water to obtain a thick paste, the erythromycinpropionate is thoroughly mixed with the paste, and is forced through a 4-mesh screen. The sieved mixture is dried, the dry material is forced through a 10-mesh screen, and is blended thoroughly with the magnesium stearate, the sodium lauryl sulfate, and the remainder of the starch powder. The mixture is compressed on a standard tabletting machine into tablets weighing about 350 mg. Each tablet contains an equivalent of about 250 mg. of erythromycin base.

An alternative composition suitable for formulation into compressed tablets is made up of the following ingredients in the amounts shown:

| | Kg. |
|---|---|
| Monoacetylerythromycin | 11.6 |
| Starch powder | 6.2 |
| Polyvinylpyrrolidone | 0.34 |
| Magnesium stearate | 0.09 |

The above ingredients are thoroughly blended in a mixing machine and the mixture is slugged, i.e., subjected to precompression. The slugs are sieved through a 10-mesh screen to provide a free-flowing dense granulation, and the granulated material is then formed into compressed tablets on a standard tabletting machine using dies of a sufficient size to provide a tablet weighing about 550 mg. A tablet of the above size and composition provides an equivalent of about 250 mg. of erythromycin base.

A solid composition suitable for filling into the telescoping gelatin capsules is prepared from the following ingredients in the amounts shown:

| | Kg. |
|---|---|
| Monopropionylerythromycin | 5.0 |
| Mineral oil | 0.1 |
| Magnesium stearate | 0.05 |
| Lactose | 4.0 |

The ingredients are thoroughly blended in an efficient mixer, and the blended mixture is filled into gelatin capsules such that each capsule contains about 300 mg. of monopropionylerythromycin.

In addition to the extending media employed in the above illustrative composition, other media can be employed, for example, stearic acid, talc, soluble starch powder, and the like.

The dosage amounts of the orally administrable compositions can be varied over a wide range, the amounts prescribed for therapeutic purposes being dependent upon such factors as the severity of the infection, the particular patient being treated, the patient response, and the like. However, the dosage amounts and regimen employed in general follow the same pattern of the present usage of erythromycin.

I claim:
1. Monoacrylylerythromycin represented by the formula

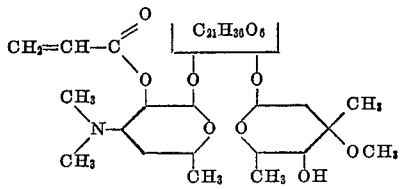

2. A member of the group consisting of monoacrylylerythromycin and its acid addition salts.
3. A therapeutic composition comprising in combination a pharmaceutical extending medium bland to gastromucosa and a member of the group consisting of monoacrylylerythromycin and its nontoxic acid addition salts.
4. A therapeutic composition comprising in combination a solid pharmaceutical extending medium bland to gastromucosa and a member of the group consisting of monoacrylylerythromycin and its nontoxic acid addition salts.
5. A therapeutic composition comprising in combination a pharmaceutical extending medium bland to gastromucosa and monoacrylylerythromycin.

References Cited in the file of this patent
UNITED STATES PATENTS

| | | |
|---|---|---|
| 2,857,312 | Stephens | Oct. 21, 1958 |
| 2,862,921 | Booth | Dec. 2, 1958 |
| 2,864,817 | Croley | Dec. 16, 1958 |